United States Patent [19]
Camarota et al.

[11] Patent Number: 5,297,010
[45] Date of Patent: Mar. 22, 1994

[54] ILLUMINATED GRAB HANDLE

[75] Inventors: Richard J. Camarota; James H. Miller, both of Holland; Steven R. Isenga, Zeeland, all of Mich.

[73] Assignee: ITC Incorporated, Zeeland, Mich.

[21] Appl. No.: 937,229

[22] Filed: Aug. 28, 1992

[51] Int. Cl.[5] .............................................. B60Q 1/32
[52] U.S. Cl. ...................................... 362/80; 362/83.3; 340/434
[58] Field of Search ................ 362/80, 81, 83.3, 61; 340/434, 468, 472, 431

[56] References Cited

U.S. PATENT DOCUMENTS

| | | | |
|---|---|---|---|
| 1,523,495 | 1/1925 | Silberman | 362/80 |
| 1,866,802 | 7/1932 | Gragg et al. | 362/80 |
| 2,483,058 | 9/1949 | Mack | 362/80 |
| 2,831,176 | 4/1958 | Liberto | 362/80 |
| 3,789,210 | 1/1974 | Weber et al. | |
| 4,467,402 | 8/1984 | Bauer et al. | 362/32 |
| 5,025,352 | 6/1991 | Brown | 362/83.3 |
| 5,150,959 | 9/1992 | Paffrath et al. | 362/80 |

FOREIGN PATENT DOCUMENTS

| | | | |
|---|---|---|---|
| 0935833 | 11/1955 | Fed. Rep. of Germany | 362/80 |
| 1132275 | 3/1957 | France | 362/80 |

Primary Examiner—Richard R. Cole
Assistant Examiner—Y. Quach
Attorney, Agent, or Firm—Flynn, Thiel, Boutell & Tanis

[57] ABSTRACT

A lighted grab handle particularly adapted for use at entry doorways on a large vehicle. The handle has a chamber in one end at an interior facing surface and which contains a recessed light socket. In use, light splashes on the vehicle wall on which the grab handle is mounted, making the handle easier to see in the dark.

12 Claims, 1 Drawing Sheet

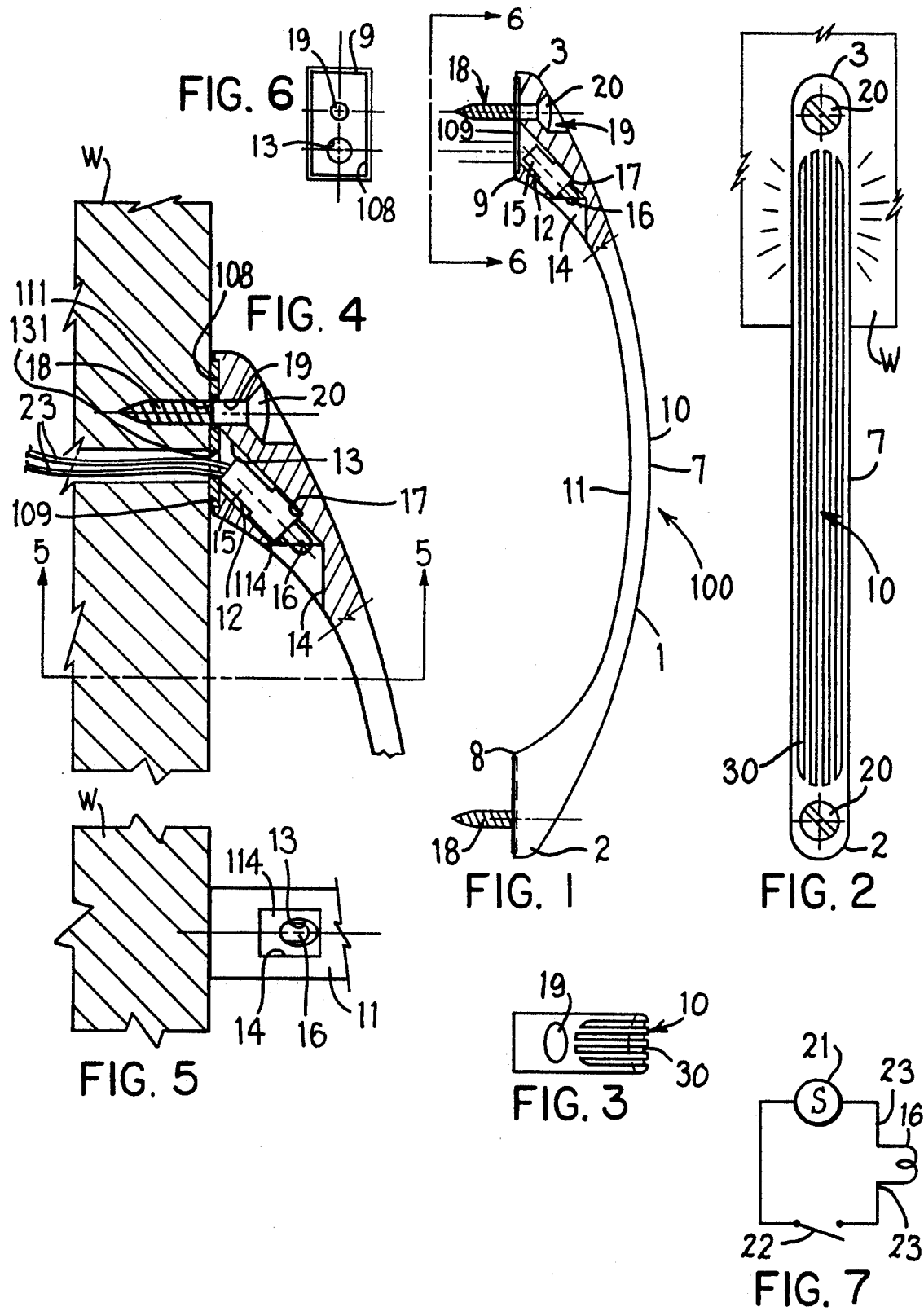

ILLUMINATED GRAB HANDLE

BACKGROUND OF THE INVENTION

1. Field of the Invention

The present invention relates to a lighted grab handle, adapted for use at entry doorways on large vehicles, particularly wheeled housing units including house trailers, travel trailers and motor homes.

2. Prior Art

Entry doorways on large vehicles, particularly wheeled housing units including house trailers, travel trailers and motor homes, tend to be raised one or more steps above the ground. To help a person step up from the ground and through the entry doorway, a grab handle is often fixed on the vehicle outside wall next to the doorway. Typically, the person opens the door with one hand, grasps the grab handle with the other hand and pulls one's self up and through the doorway.

Prior grab handles of this type have occasionally been illuminated, to be more easily found in the dark.

U.S. Pat. No. 3 789 210 illustrates a prior lighted grab handle. Same is a large unit to be recessed in a wall and having a central handle and illuminated windows on either side of the handle.

However, this prior art unit is large, bulky and hard to install. A large mounting surface area is required to accommodate the unit. Further, the windows on either side of the handle are fragile and thus easily marred or broken.

Another type of lighted grab handle known to the present Applicant is an illuminated acrylic tube used as a light pipe. However, this device is rather fragile and can be broken. It is easily marred and thus may look worn after a rather short time. Also, sunlight and changing temperatures will tend to damage the material of the handle after prolonged exposure.

The present invention is intended to overcome the aforementioned problems in the prior art lighted handles.

It is an object of the present invention to provide a lighted handle suitable for mounting on an outside wall of a vehicle, particularly near an entry door, in which a light bulb is contained in the handle itself, in which the light bulb lights up the wall area behind the handle, in which the entry door and handle are thus more visible, and in which the user is helped in finding the entry door and in achieving entrance into the vehicle.

BRIEF DESCRIPTION OF THE DRAWINGS

FIG. 1 is a side view of a lighted grab handle embodying the invention, partially broken to show a fastening means and a light source receiving chamber;

FIG. 2 is a top view of the handle of FIG. 1;

FIG. 3 is an end view of FIG. 1;

FIG. 4 is an enlarged view of the light source receiving chamber in the top end portion of the handle of FIG. 1;

FIG. 5 is a cross-sectional view taken substantially on the line 5—5 of FIG. 4;

FIG. 6 is a cross-sectional view taken substantially on the line 6—6 of FIG. 1, with the gasket removed; and FIG. 7 is a schematic diagram of a circuit usable with the apparatus of FIG. 1.

DETAILED DESCRIPTION

A lighted grab handle 100 (FIGS. 1-7) is mountable on the outside wall W of a vehicle.

The handle 100, embodying the invention, comprises a rigid member 1 of generally bent configuration, including bottom and top end portions 2, 3 mountable on the wall W in laterally spaced relation from each other and joined by a central portion 7. The rigid member 1 is preferably of cast aluminum. It may also be of other materials, e.g., of metal or plastic materials of sufficient strength to support the user. The space between the end portions 2, 3 and between the central portion 7 and the wall W is sufficient to allow comfortable insertion of a human hand therein for gripping at the central portion 7. The length of the grab handle 100 is preferably in the range of 6 to 12 inches. The width of the grab handle is preferably in the range of ¾ to 2 inches. The handle 100 must be long and wide enough to provide a good grip to the user. The rigid member 1 is preferably a one-piece member having a shallow, generally C-shaped or bow-shaped curvature.

The end portions 2, 3 have mounting faces 8, 9, respectively, opposable to the mounting surface of the wall W. The mounting faces 8, 9 are here each recessed at 108 in a shallow manner for filling with a gasket 109 somewhat thicker than the depth of the recess. The gasket 109 eliminates the need for sealing or caulking material. The mounting faces 8, 9 of the end portions 2, 3 of the rigid member 1 are substantially coplanar. The handle end portions 2, 3 contact the wall W through the gaskets 109. The grab handle 100 has an external surface 10 for facing away from the outside wall W of the vehicle and an interior surface 11 for facing toward the vehicle wall W.

The end portions 2, 3 are thicker (see FIG. 1) than the central portion 7. The external surface 10 of the rigid member 1 is preferably convexly curved and the interior surface 11 is preferably concave, with a radius which is substantially less than the radius of the external surface 10 minus the thickness of the member central portion 7. The end portions 2, 3 preferably flare out away from the central portion 7.

One of the end portions 3 of the rigid member 1 contains a chamber 12. The chamber 2 includes a passage 13 opening through the mounting face 9 of the top end portion 3 of the rigid member 1. The passage 13 extends at an angle to the corresponding top mounting face 9 and is angled toward the opposed bottom end portion 2. The passage 13 has its length axis parallel to a tangent to either of the curved interior and exterior surfaces 11, 10. The chamber 12 also includes a recess 14 opening through the interior facing surface of the top end portion 3. The recess 14 faces toward the bottom end portion 2 and into the space bounded by the central portion 7 of the rigid member 1 and the vehicle wall W on which the handle 100 is mounted. The recess 14 has an end wall 114 through which partially opens the passage 13. The axis of the recess 14 may be substantially parallel to the mounting face 9. The passage 13 axis is angled to the recess 14 axis.

A lamp socket 15 is inserted snugly but releasably into the open end of the passage 13 and opens toward the recess 14. A bulb 16 releasably occupies the socket 15 and extends into the recess 14. The passage 13 and recess 14 are somewhat misaligned, so that a step 17 (FIG. 4) blocks the socket 15 against movement into the recess 14.

The light socket 15 is preferably conventional and can accommodate a small, low wattage light bulb 16. The light bulb 16 is small enough to be substantially contained by the recess 14. The bulb 16 here extends slightly beyond the recess 14 for convenient gripping by the user to facilitate replacement. The socket 15 is held axially in place within the passage 13 by end abutting the adjacent gasket 109. When in place, the socket and bulb are not in view by a user standing in front of the grab handle 100. The bulb 16 is located in such a manner that light emitted from the bulb 16 shines out through the recess 14 into the space between the central portion 7 of the member 1 and the vehicle wall W on which the handle 100 is mounted. Light from the light bulb, directly and by reflection from the interior facing wall of the recess 14, splashes on the vehicle wall W behind the grab handle 100. All that is seen is the splash of light emanating from behind the handle when the power is turned on. The splash of light extends laterally beyond the sides of the handle along the wall W. In this manner, the user can see the handle 100 at night by the light reflected from the wall W. This assists the user in gaining safe entry or exit into or out of a vehicle.

Here the external surface 10 of the rigid member 1 contains several parallel grooves 30 which frictionally assist in preventing the user's hand from slipping.

FIG. 7 shows an example of a circuit which may be used in conjunction with the grab handle 100. As shown, an electric power source 21 is connected in series loop with a switch 22 and the lamp socket 16 of the grab handle 100. The connection to the light socket is via insulated electrical wires 23 shown in FIG. 4. The lamp 16 can be turned on and turned off by a manual switch 22 at the convenience of the user. The switch 22 can also be controlled automatically, as by a conventional light sensor or timer. The power source 21 may be, for example, the vehicle's storage battery.

The grab handle 100 is mounted on the wall W of a vehicle by any convenient mounting means such as the screws 18 here shown, nut and bolt connectors or other suitable means of sufficient strength to hold the weight of the user. The end portions 2, 3 each have a mounting hole 19 extending substantially perpendicular to their mounting faces 8, 9. The screws 18 are each inserted through a respective hole 19 in the respective end portion 2, 3 of the rigid member 1, and through a suitable hole 111 in the respective gasket 109, into the vehicle wall W. Each gasket 109 also has a hole 131 therethrough for passage of the wires 23 therethrough and then through a hole 13 in the wall W. Heads 20 of the screws 18 are exposed through the exterior surface 10 of the member 1 for access by a tightening or loosening tool (not shown). The screw hole 19 and light socket passage 13 here extend through the interior facing mounting surface 108 relatively close together.

Replacement of the bulb 16 in the socket 15 is done by dismounting the rigid member 1 from a wall W on which it is installed, removing the gasket 109, pulling the socket 15 out of the passage 13 and away from the recess 14, replacing the bulb 16 in the socket 15 and then reversing the above described removal steps.

OPERATION

In operation, the grab handle is mounted with screws or other fastening means on an outside wall of a vehicle near an entry door and connected to a power source via the circuitry as seen in FIG. 7. When the power source is turned on, the light bulb contained in the handle itself illuminates the area of the wall directly behind the handle. This illumination makes the handle easily visible to an approaching user in the darkness. It leads the user directly to the entry and the handle. The handle aids the user in stepping up into a vehicle. The user simply grabs the lighted handle to pull himself up a step and into a vehicle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A lighted grab handle for mounting on an outside wall of a vehicle, comprising:
    a rigid member of generally bent configuration including a pair of end portions mountable on a wall in spaced relation from each other and joined by a central portion spaced away from such wall, so as to allow insertion of a human hand between handle and wall, said end portions each having a mounting face opposable to such wall, said member having an external surface for facing away from such wall and having an interior surface for facing toward such wall;
    a chamber in a given said end portion of said member, said chamber being defined by a passage opening through the mounting face of one end portion of said member and extending from the mounting face, into said member end portion, and toward the central portion of said member, said chamber further including a recess opening through the interior surface of said one end portion and facing toward the other end portion and into a space bounded by the central portion of said member and such wall on which the handle is mounted, said recess being open to said passage;
    a light socket mountable in said passage for locating a light bulb where the passage communicates with said recess so that light emitted from the bulb shines out through said recess into the space between the central portion of said member and such wall on which the handle is mounted to illuminate an area of such wall.

2. The handle of claim 1 in which a step is formed in said passage to reduce the cross-section of the passage where the passage communicates with the recess, the step preventing the socket fm passing from said passage into said recess and locating a light bulb so as to remain within and not extend beyond the recess, so that the light bulb is protected within the recess from unintended engagement by a user's hand.

3. The handle of claim 1 including mounting means for mounting the handle on the wall of the vehicle, a hold in each end portion of sad member, the hole extending through the mounting face of each said end portion and through the external surface of each said end portion such that the mounting means can extend through said hole to fasten securely in such wall and wherein a head of the mounting means is exposed through the external surface of the end portion for access by a tightening or loosening tool.

4. The handle of claim 3 in which the mounting means comprise a screw associating with each end portion.

5. The handle of claim 4 in which the hole and the light socket passage extend through the mounting face of said one end portion of the member and are at least close together where they pass through the mounting face of said one end portion.

6. The handle of claim 1 in which the member is a one-piece member having a shallow, generally C-shaped curvature, the mounting faces of the end portions of said member being substantially coplanar, said end portions each having a mounting hole extending substantially perpendicular to the mounting face thereof, said passage extending at an angle to said mounting face of said one end portion and being angled toward said other end portion.

7. The handle of claim 1 in which said member is substantially bow-shaped, having a thin central portion and thickened end portions, said member having its external surface convexly curved on a radius about a center and its interior surface concavely curved on a radius about a center, said concavely curved interior surface having its radius substantially less than the radius of the external surface minus the thickness of the member central portion, said concave interior surface having its center substantially closer to said member central portion than is the center for the radius of said external surface, said end portions flaring out toward their respective mounting faces, their respective mounting faces being substantially coplanar, said passage having a length axis substantially parallel to a tangent to at least one of said curved interior and external surfaces of said member, said recess having an axis which is angled with respect to the passage axis and is substantially parallel to said mounting face of said given end portion.

8. The handle of claim 1 in which a light socket is releasably received within said passage, wires extending from said socket through an end of the passage opening through the mounting face of said one end portion, said socket being open to said recess, said recess having a portion through which a central axis of the socket extends, said socket being located to enable replacement of a bulb in said socket through said recess without demounting said member from such wall on which it is installed.

9. The handle of claim 8 in which the bulb extends somewhat into said recess from said passage, the bulb being uncovered by reason of the fact that the recess opens away from the socket and into the space between the central portion of the member and a wall on which it is to be mounted.

10. The handle of claim 1 including means for making a splash of light on a wall on which the handle is mounted, which splash of light is visible to a person approaching the handle, the splash of light extending laterally beyond the sides of the handle along a wall on which the handle is mounted, said light splash making means being a bulb shining out through such recess, said recess and bulb being hidden from the person approaching the wall on which the handle is mounted, such that the handle is illuminated by indirect light reflected from the wall on which the handle is mounted.

11. The handle of claim 10 in which said recess has a surface facing at an angle toward a vehicle wall on which the handle is to be fixed, said recess surface reflecting light from a bulb in said socket for making a splash of light on this vehicle wall.

12. The handle of claim 1 in which said member is a cast metal member with said passage and recess being cast in place therein.

* * * * *

UNITED STATES PATENT AND TRADEMARK OFFICE
CERTIFICATE OF CORRECTION

PATENT NO. : 5,297,010
DATED : March 22, 1994
INVENTOR(S) : Richard J. CAMAROTA et al It is certified that error appears in the above-identified patent and that said Letters Patent is hereby corrected as shown below:

Column 4, line 51; change "fm" to ---from---.
        line 58; change "hold" to ---hole---.
                change "sad" to ---said---.

Signed and Sealed this

Ninth Day of August, 1994

Attest:

BRUCE LEHMAN

Attesting Officer     Commissioner of Patents and Trademarks